(12) United States Patent
Ide et al.

(10) Patent No.: US 8,104,457 B2
(45) Date of Patent: Jan. 31, 2012

(54) DIESEL ENGINE SYSTEM WITH EXHAUST GAS RECIRCULATION

(75) Inventors: Kazunari Ide, Nagasaki-ken (JP); Hiroyuki Endo, Kanagawa-ken (JP); Shinichi Sato, Nagasaki-ken (JP); Akihide Okajima, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 929 days.

(21) Appl. No.: 12/071,119

(22) Filed: Feb. 15, 2008

(65) Prior Publication Data
US 2008/0202118 A1 Aug. 28, 2008

(30) Foreign Application Priority Data
Feb. 28, 2007 (JP) ................. 2007-050719

(51) Int. Cl.
F02B 47/08 (2006.01)
(52) U.S. Cl. .............. 123/568.18; 701/108
(58) Field of Classification Search .......... 60/605.2; 123/568.19, 568.18, 568.21, 568.23, 568.24; 701/108
See application file for complete search history.

(56) References Cited

U.S. PATENT DOCUMENTS

| | | | | |
|---|---|---|---|---|
| 4,366,799 A * | 1/1983 | Suda | ............ | 123/568.19 |
| 5,918,582 A * | 7/1999 | Itoyama et al. | ............ | 123/568.29 |
| 6,032,656 A * | 3/2000 | Itoyama et al. | ............ | 123/568.21 |
| 6,170,469 B1 * | 1/2001 | Itoyama et al. | ............ | 123/480 |
| 6,230,697 B1 * | 5/2001 | Itoyama et al. | ............ | 123/568.21 |
| 7,356,403 B2 * | 4/2008 | Yoshioka et al. | ............ | 701/108 |
| 2001/0054416 A1 | 12/2001 | Yoshizaki et al. | | |
| 2004/0079342 A1 * | 4/2004 | Kojima et al. | ............ | 123/568.21 |
| 2004/0134192 A1 * | 7/2004 | Umehara et al. | ............ | 60/605.2 |
| 2005/0171670 A1 * | 8/2005 | Yoshioka et al. | ............ | 701/54 |
| 2008/0167790 A1 * | 7/2008 | Kotooka et al. | ............ | 701/108 |
| 2010/0010728 A1 * | 1/2010 | Stein et al. | ............ | 701/108 |

FOREIGN PATENT DOCUMENTS

| | | |
|---|---|---|
| CN | 1217425 | 5/1999 |
| EP | 0 809 009 | 11/1997 |
| EP | 0 987 425 | 3/2000 |

(Continued)

OTHER PUBLICATIONS

Chinese Office Action dated Jul. 17, 2009 for Chinese Application No. 200810009946.9 with English translation.

(Continued)

*Primary Examiner* — Thomas Denion
*Assistant Examiner* — Mary A Davis
(74) *Attorney, Agent, or Firm* — Wenderoth, Lind & Ponack, L.L.P.

(57) ABSTRACT

A diesel engine system includes a diesel engine, a throttle valve, an EGR (Exhaust Gas Recirculation) path, an EGR valve and a controller. The throttle valve controls a flow rate of intake air to the diesel engine. Exhaust gas is recirculated along the EGR path from an exhaust port to an intake port of the diesel engine. The EGR valve controls a flow rate of the exhaust gas. The controller controls the throttle valve and the EGR valve such that an opening of the throttle valve decreases and an opening of the EGR valve increases when a load of the diesel engine increases. The controller controls the EGR valve such that the opening of the EGR valve increases after the opening of the EGR valve is held constant for a first predetermined holding time.

11 Claims, 11 Drawing Sheets

FOREIGN PATENT DOCUMENTS

| | | |
|---|---|---|
| EP | 1 156 201 | 11/2001 |
| EP | 1 413 724 | 4/2004 |
| JP | 06-074070 | 3/1994 |
| JP | 11-050917 | 2/1999 |
| JP | 11-62662 | 3/1999 |
| JP | 11-280525 | 10/1999 |
| JP | 3092547 | 7/2000 |
| JP | 3448862 | 7/2003 |
| WO | WO 2006059558 A1 * | 6/2006 |

OTHER PUBLICATIONS

European Search Report issued Oct. 10, 2008 for European Application No. 08151491.1.

* cited by examiner

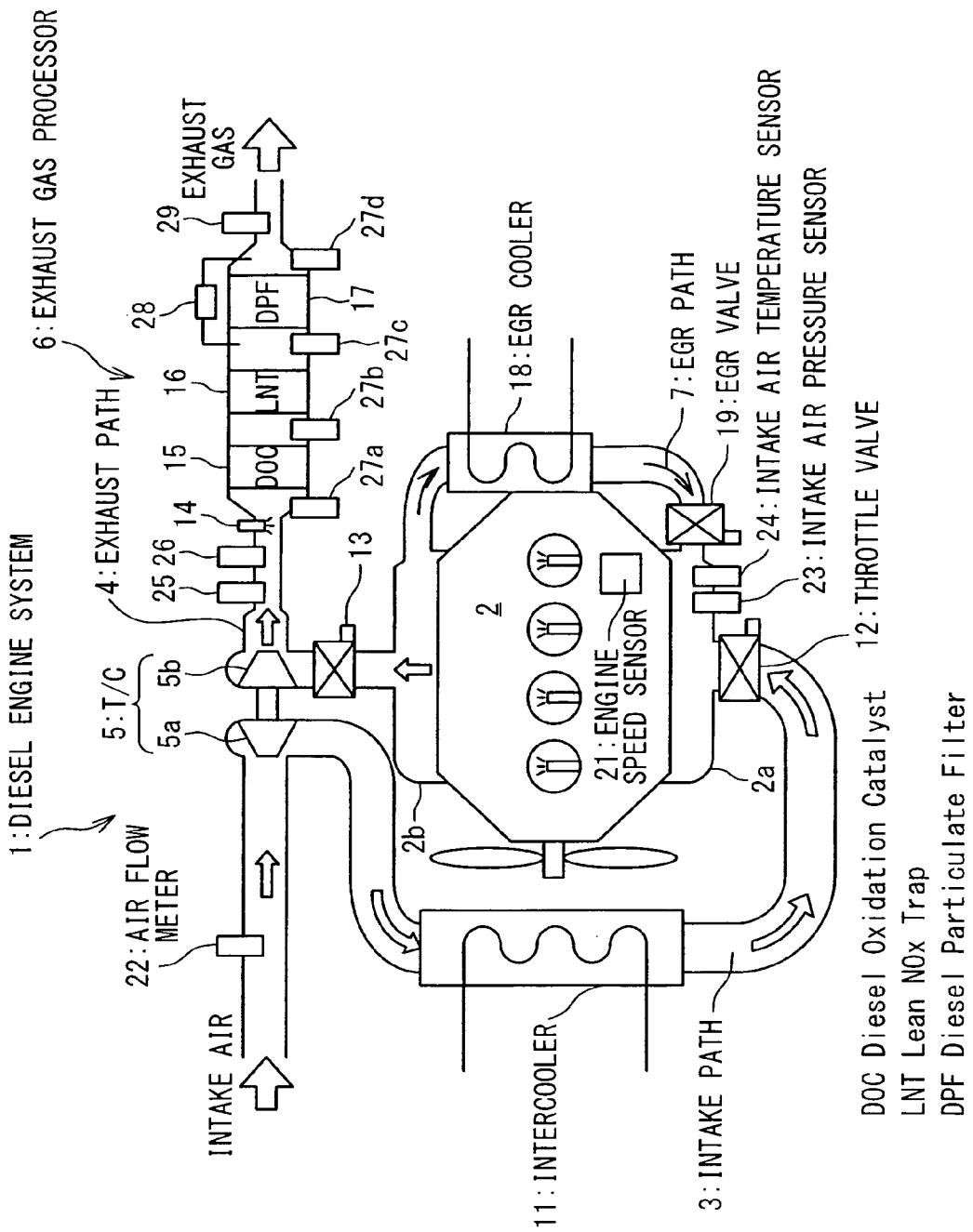

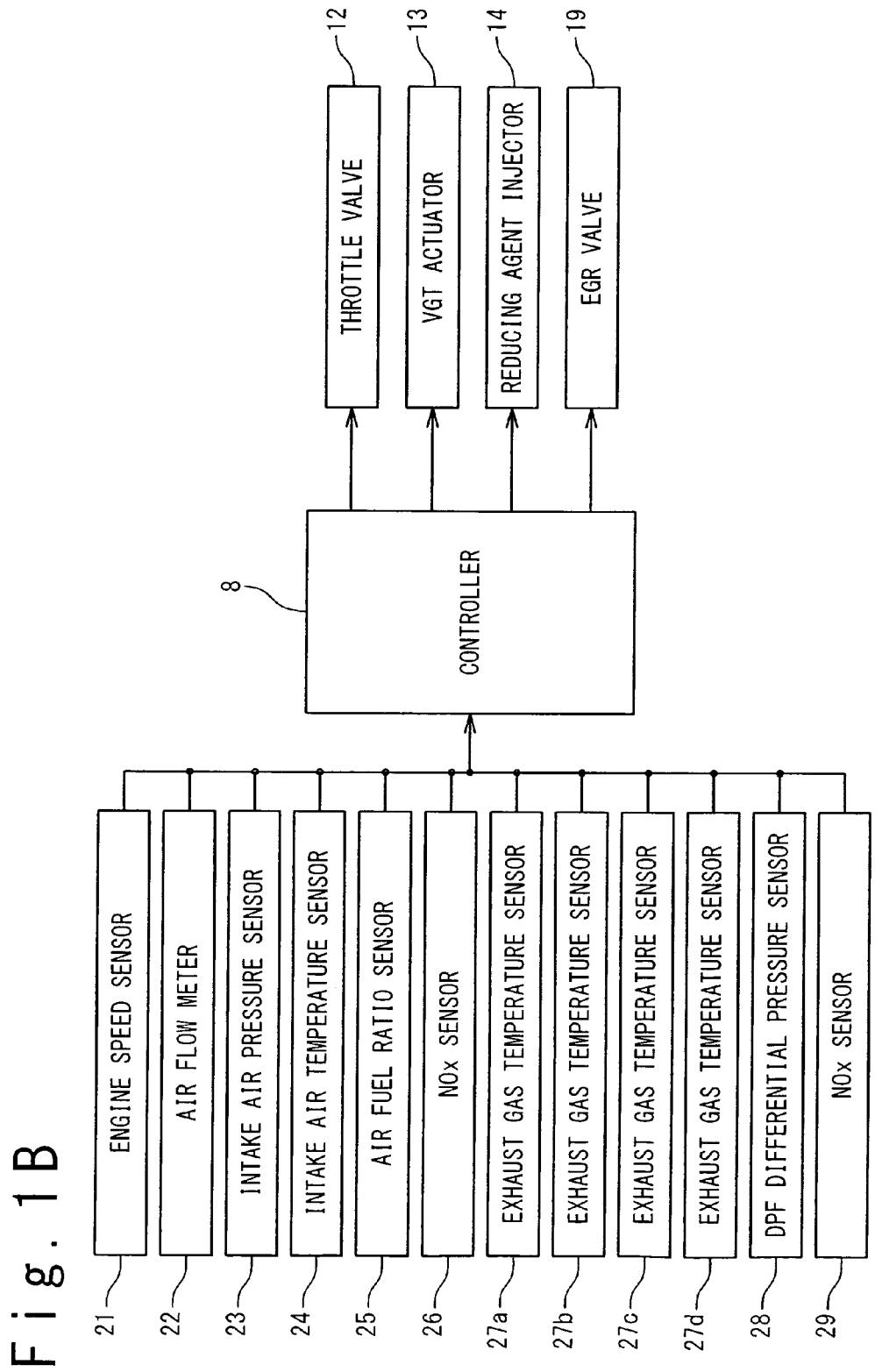

DIESEL ENGINE SYSTEM WITH EXHAUST GAS RECIRCULATION

BACKGROUND OF THE INVENTION

1. Field of the Invention

The present invention relates to a diesel engine system, and more particularly relates to reducing pollutant such as NOx (nitrogen oxide) and PM (Particulate Matter) in exhaust gas from a diesel engine. This Patent application is based on Japanese Patent application No. 2007-050719. The disclosure thereof is incorporated herein by reference.

2. Description of the Related Art

Exhaust gas recirculation (EGR) in which exhaust gas from a diesel engine is partially recirculated to an intake pipe is known as one of methods used to reduce nitrogen oxide in the exhaust gas. The exhaust gas includes no oxygen or oxygen of low concentration. Thus, when the exhaust gas is recirculated to the intake pipe, combustion is carried out in a state of low oxygen concentration. For this reason, a combustion temperature is decreased, thereby suppressing the production of NOx. The exhaust gas recirculation is disclosed in, for example, Japanese Patent No. 3448862, Japanese Patent No. 3092547, Japanese Laid Open Patent Application (JP-A-Heisei, 11-50917) and Japanese Laid Open Patent Application (JP-A-Heisei, 11-280525).

A structure of a diesel engine that employs the exhaust gas recirculation is described schematically as follows. An EGR path (exhaust gas recirculation channel) is provided between an exhaust port and an intake port of the diesel engine. Along the EGR path, exhaust gas is recirculated to an intake path. An EGR valve (exhaust gas recirculation controlling valve) for controlling the flow rate of the recirculated exhaust gas is provided to the EGR path. In addition, a throttle valve (intake throttle valve) for controlling the flow rate of intake air is provided to the intake path.

The openings of the EGR valve and the throttle valve are controlled such that an excess air ratio agrees with a desired value. Specifically, when the excess air ratio is higher than the desired value, the opening of the EGR valve is made to increase, thereby making the flow rate of the recirculated exhaust gas to increase. After the EGR valve is fully opened, the opening of the throttle valve is made to decrease. In such control, the flow rate of the recirculated exhaust gas is made to increase and the flow rate of external air as the intake air is made to decrease as necessary, and thus the excess air ratio is made to decrease to the desired value. On the other hand, when the excess air ratio is lower than the desired value, the opening of the throttle valve is made to increase. When the throttle valve is fully opened and the excess air ratio is still lower than the desired value, the opening of the EGR valve is made to decrease. In such control, the flow rate of the external air is made to increase and the flow rate of the recirculated exhaust gas is made to decrease as necessary, and thus the excess air ratio is made to increase to the desired value.

It is important that the openings of the EGR valve and the throttle valve are required to be controlled based on the load of the diesel engine in order to reduce the nitrogen oxide effectively. Because the openings of the EGR valve and the throttle valve to attain the desired excess air ratio vary depending on the load of the engine. Even when the opening of the EGR valve is constant, the flow rate of the recirculated exhaust gas varies depending on the load of the diesel engine, especially, on an engine speed of the engine (number of revolutions of the engine).

Specifically, when the load of the diesel engine is small (namely, when the engine speed is low), the pressure of the intake air is low. Thus, the flow rate of the recirculated exhaust gas can be high even when the opening of the EGR valve is small. Therefore, when the load of the diesel engine is small, the opening of the EGR valve is made small, and the opening of the throttle valve is made large. On the other hand, when the load of the diesel engine is large, the opening of the EGR valve is required to be large to make the exhaust gas to be recirculated at a desired flow rate. Therefore, when the load of the diesel engine is large, the opening of the EGR valve is made large, or the opening of the throttle valve is made small. Such control can maximize the reduction of the nitrogen oxide.

Such control has one problem that much smoke is produced during the increase in the load of the diesel engine. In other words, much particulate matter is produced during the increase in the load. From the viewpoint of securing the flow rate of the recirculated exhaust gas to reduce the nitrogen oxide, it is preferable to make the opening of the EGR valve to increase as the load of the diesel engine increases. It is more preferable to make the opening of the throttle valve decrease as necessary in addition to the increase in the opening of the EGR valve. However, such control has an adverse effect that the necessary flow rate of the intake air is not secured during the increase in the load of the diesel engine. As the load of the diesel engine increases, the necessary flow rate of the intake air increases. However, the opening of the EGR valve is made to increase or the opening of the throttle valve is made to decrease in order to reduce the nitrogen oxide, the external air supplied to the diesel engine is reduced, and thus the necessary flow rate of the intake air is not secured. In such case, incomplete combustion occurs in a combustion chamber of the diesel engine, and the smoke is produced. Since the increase in the load of the diesel engine has an action to induce the increase in the flow rate of the intake air, after the end of the increase in the load of the diesel engine (namely, after the end of the increase in the engine speed), the problem is not critical that the necessary flow rate of the intake air is not secured. However, the action to induce the increase in the flow rate of the intake air is not effective during the increase in the load. Therefore, during the increase in the load, the problem is critical that when the opening of the EGR valve is made to increase or when the opening of the throttle valve is made to decrease, the necessary flow rate of the intake air is not secured and the smoke is produced.

From such background, it is required to suppress the production of the smoke during the increase in the load of the engine without inhibiting the reduction of the nitrogen oxide.

By the way, Japanese Laid Open Patent Application (JP-A-Heisei, 6-74070) discloses an air fuel ratio controller which controls air fuel ratio for an engine. A turbo charger, which is driven by exhaust gas from the engine, is connected to the engine through an intake path. The intake path is provided with a gas mixer and a throttle valve. The throttle valve is arranged between the gas mixer and the engine. The gas mixer supplies mixed gas in which fuel and intake air are mixed to the engine through the throttle valve. A portion of the intake path between the turbo charger and the gas mixer is connected through a bypass valve to another portion of the intake path between the gas mixer and the throttle valve.

The air fuel ratio controller includes a first delay circuit and a second delay circuit. The first delay circuit averages a voltage signal which indicates oxygen concentration in the exhaust gas. The second delay circuit delays a difference signal between the averaged voltage signal and a desired value signal. The desired value signal is set based on temperature of the exhaust gas. The controller controls the bypass valve based on the delayed difference signal.

SUMMARY OF THE INVENTION

An object of the present invention is to suppress the production of the smoke during the increase in the load of the engine without inhibiting the reduction of the nitrogen oxide.

In one aspect of the present invention, a diesel engine system includes: a diesel engine; a throttle valve configured to control a flow rate of intake air to the diesel engine; an EGR (Exhaust Gas Recirculation) path along which exhaust gas is recirculated from an exhaust port to an intake port of the diesel engine; an EGR valve configured to control a flow rate of the exhaust gas; and a controller configured to control the throttle valve and the EGR valve such that an opening of the throttle valve decreases and an opening of the EGR valve increases when a load of the diesel engine increases. The controller is configured to control the EGR valve such that the opening of the EGR valve increases after the opening of the EGR valve is held constant for a first predetermined holding time.

According to the above configuration, since the opening of the EGR valve is held constant for the first predetermined holding time, an action is not inhibited in which the increase in the load of the diesel engine induces the increase in the flow rate of the intake air. Therefore, in the diesel engine system, the necessary flow rate of the intake air is secured and the production of smoke is suppressed during the increase in the load of the diesel engine. Preferably, the first holding time is from 1 second to 5 seconds.

From the view point of the suppression of the production of the smoke, the controller is preferably configured to control the throttle valve such that the opening of the throttle valve decreases after the opening of the throttle valve is held constant for a second predetermined holding time. Preferably, the second holding time is from 1 second to 5 seconds.

When the diesel engine system is provided with an air flow meter which measures the flow rate of the intake air, it is preferable that a desired value of the flow rate of the intake air is determined from the load and that the openings of the throttle valve and the EGR valve are determined through a feedback control based on an error between the desired value and a measured value of the flow rate of the intake air obtained by the air flow meter.

Specifically, it is preferable that a first control parameter is determined through a PID (Proportional-Integral-Derivative) or PI (Proportional Integral) control based on the error, that a second control parameter is determined by applying a delay logic to the first control parameter, that a third control parameter is determined by applying a saturation calculation to the second control parameter and that the openings of the throttle valve and the EGR valve are determined from the third control parameter. In this case, the delay logic is defined that the second control parameter is held for the first holding time when the opening of the EGR valve is made to increase. An anti-windup correlation is preferably executed on the PID or PI control to improve the response of the control. The anti-windup correlation is executed based on a difference between the first control parameter and the third control parameter.

It is also preferable that the openings of the throttle valve and EGR valve are determined through a feedforward control based on the load of the diesel engine. When the feedforward control is executed, the control is especially effective in which the opening of the EGR valve is made to increase after the opening of the EGR valve is held constant for the first predetermined holding time.

In another aspect of the present invention, a diesel engine system includes: a diesel engine; a throttle valve configured to control a flow rate of intake air to the diesel engine; an EGR (Exhaust Gas Recirculation) path along which exhaust gas is recirculated from an exhaust port to an intake port of the diesel engine; an EGR valve configured to control a flow rate of the exhaust gas; and a controller configured to control the throttle valve and the EGR valve such that an opening of the throttle valve decreases and an opening of the EGR valve increases when a load of the diesel engine increases. The controller is configured to control the throttle valve such that the opening of the throttle valve decreases after the opening of the throttle valve is held constant for a predetermined holding time.

According to the above configuration, since the opening of the throttle valve is held constant for the predetermined holding time, an action is not inhibited in which the increase in the load of the diesel engine induces the increase in the flow rate of the intake air. Therefore, in the diesel engine system, the necessary flow rate of the intake air is secured and the production of smoke is prevented during the increase in the load of the diesel engine.

BRIEF DESCRIPTION OF THE DRAWINGS

FIG. 1A shows a configuration of a diesel engine system according to an embodiment of the present invention;

FIG. 1B is a block diagram showing a configuration of a control system of the diesel engine system of FIG. 1A;

DETAILED DESCRIPTION OF PREFERRED EMBODIMENTS

Figure 2A:
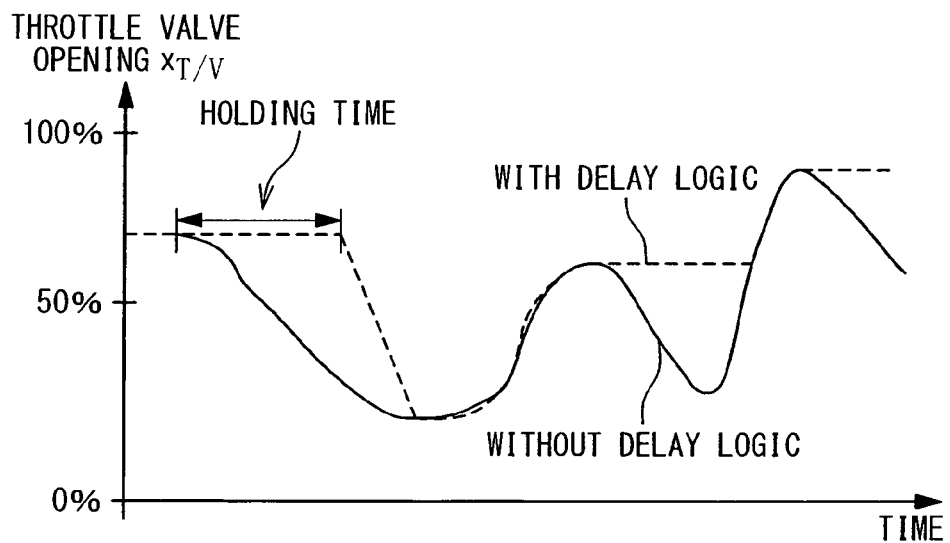
FIG. 2A is a graph showing an example of a change in an opening of a throttle valve.

FIG. 1A shows a configuration of a diesel engine system 1 according to an embodiment of the present invention. The diesel engine system 1 includes a diesel engine 2, an intake path 3, an exhaust path 4, a turbo charger 5, an exhaust gas processor 6 and an EGR path 7. The intake path 3 is connected to an intake port 2a of the diesel engine 2, and the exhaust path 4 is connected to an exhaust port 2b of the diesel engine 2. The turbo charger 5 is driven by exhaust gas exhausted to the exhaust path 4 from the diesel engine 2 and compresses intake air. The exhaust gas processor 6 removes pollutant, such as NOx and PM, from the exhaust gas. The EGR path 7 is provided to connect the exhaust port 2b and the intake port 2a.

The intake path 3 is provided with a compressor wheel 5a of the turbo charger 5, an intercooler 11 and a throttle valve 12. The intake air compressed by the turbo charger 5 is cooled by the intercooler 11 and then supplied through the throttle valve 12 to the diesel engine 2. The throttle valve 12 is used to control the flow rate of the intake air.

The exhaust path 4 is provided with a VGT (Variable Geometry Turbocharger) actuator 13 and a turbine wheel 5b of the turbo charger 5. The VGT actuator 13 is used to control the flow rate of the exhaust gas introduced to the turbine wheel 5b of the turbo charger 5. The turbine wheel 5b is driven by the introduced exhaust gas and drives the compressor wheel 5a provided in the intake path 3. Thus, the intake air in the intake path 3 is compressed. The exhaust gas exhausted from the turbine wheel 5b of the turbo charger 5 is introduced into the exhaust gas processor 6.

The exhaust gas processor 6 includes a reducing agent injector 14, a DOC (Diesel Oxidation Catalyst) 15, an LNT (Lean NOx Trap) 16 and a DPF (Diesel Particulate Filer) 17. The reducing agent injector 14 injects reducing agent into the exhaust gas to deduce it. The DOC 15, the LNT 16 and the DPF 17 are used to remove NOx and particulate matter (PM) from the exhaust gas.

The exhaust gas is recirculated along the EGR path 7 from the exhaust port 2b to the intake, port 2a to reduce the discharge of NOx to the external. The EGR path 7 is provided with an EGR cooler 18 and an EGR valve 19. The EGR cooler 18 cools the recirculated exhaust gas. The EGR valve 19 controls flow rate of the recirculated exhaust gas.

In order to properly control the throttle valve 12, the VGT actuator 13, the reducing agent injector 14 and the EGR valve 19, various measuring instruments and sensors are provided at the respective positions of the diesel engine system 1. Specifically, the diesel engine 2 is provided with an engine speed sensor 21 for measuring its engine speed (number of revolutions) N. The intake path 3 is provided with an air flow meter 22 for measuring an intake air flow rate $G_{air}$ (namely, the flow rate of the intake air in the intake path 3). The air flow meter 22 is positioned upstream from the turbo charger 5. In addition, the intake port 2a is provided with an intake air pressure sensor 23 and an intake air temperature sensor 24, and the exhaust path 4 is provided with an air fuel ratio sensor 25 and a NOx sensor 26. Moreover, the exhaust gas processor 6 is provided with exhaust gas temperature sensors 27a to 27d and a DPF differential pressure sensor 28 and a NOx sensor 29.

As shown in FIG. 1B, output signals of the engine speed sensor 21, the air flow meter 22, the intake air pressure sensor 23, the intake air temperature sensor 24, the air fuel ratio sensor 25, the NOx sensor 26, the exhaust gas temperature sensors 27a to 27d, the DPF differential pressure sensor 28 and the NOx sensor 29 are supplied to a controller 8. The controller 8 controls the openings of the throttle valve 12, the VGT actuator 13, the reducing agent injector 14 and the EGR valve 19 based on the output signals.

As mentioned above, the control of the throttle valve 12 and the EGR valve 19 has influence on the production of the nitrogen oxide and the smoke (or the particulate matter). One feature of the diesel engine system 1 according to the present embodiment is that the appropriate control for the throttle valve 12 and the EGR valve 19 effectively suppresses the production of the smoke during the increase in the load of the engine without inhibiting the reduction of the nitrogen oxide.

Figure 2B:
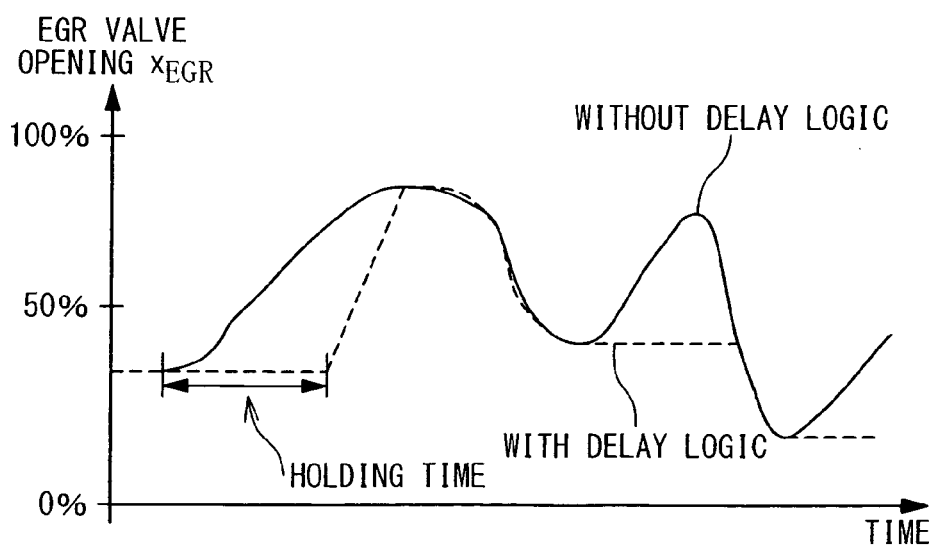
FIG. 2B is a graph showing an example of a change in an opening of an EGR valve.

Specifically, in the diesel engine system 1 according to the present embodiment, the throttle valve 12 and the EGR valve 19 are controlled such that response speeds are different when their openings are made to increase than when their openings are made to decrease. Specifically, as shown in FIG. 2A, as for the throttle valve 12, when its opening $x_{T/V}$ is made to decrease, the decrease in the opening $x_{T/V}$ is started after the opening $x_{T/V}$ is held constant for a predetermined holding time. When the opening $x_{T/V}$ is made to increase, the opening $x_{T/V}$ is immediately made to increase (without waiting for the elapse of the holding time). On the other hand, as for the EGR valve 19, as shown in FIG. 2B, when its opening $x_{EGR}$ is made to increase, the increase in the opening $x_{EGR}$ is started after the opening $x_{EGR}$ is held constant for the predetermined holding time. When the opening $x_{EGR}$ is made to decrease, the opening $x_{EGR}$ is immediately made to decrease (without waiting for the elapse of the holding time).

According to such control, the production of the smoke is effectively suppressed during the increase in the load of the diesel engine 2 without inhibiting the reduction of the nitrogen oxide. When the load of the diesel engine 2 increases, the opening of the EGR valve 19 is finally made to increase in order to suppress the production of the nitrogen oxide, and the opening of the throttle valve 12 is made to decrease as necessary in addition to the increase in the opening of the EGR valve 19. The increase in the opening of the EGR valve 19 or the decrease in the opening of the throttle valve 12 induces the decrease in the flow rate of the intake air from the external. Thus, this may cause imperfect combustion which produces the smoke. However, in the present embodiment, the openings of the throttle valve 12 and the EGR valve 19 are held constant for the predetermined holding time. Thus, during the increase in the load of the diesel engine 2, the action in which the increase in the load of the diesel engine 2 induces the increase in the flow rate of the intake air is unlikely to be inhibited. Hence, it is possible that the necessary flow rate of the intake air is secured and the production of the smoke is suppressed even during the increase in the load.

On the other hand, when the load of the diesel engine 2 decreases, the opening of the throttle valve 12 is immediately made to increase (without waiting for the elapse of the holding time), and the opening of the EGR valve 19 is made to decrease as necessary in addition to the increase in the opening of the throttle valve 12. Thus, the excess air ratio is optimally controlled, resulting in the suppression of the production of the smoke.

The holding time for the opening $x_{T/V}$ of the throttle valve 12 and the opening $x_{EGR}$ of the EGR valve 19 is preferred to be from one second to five seconds. When the holding time for the opening $x_{T/V}$ of the throttle valve 12 and the opening $x_{EGR}$ of the EGR valve 19 is too short, the necessary flow rate of the intake air is not secured during the increase in the load of the diesel engine 2. On the other hand, when the holding time for the opening $x_{T/V}$ of the throttle valve 12 and the opening $x_{EGR}$ of the EGR valve 19 is too long, resulting in undesired increase in the production of the nitrogen oxide.

Figure 3:
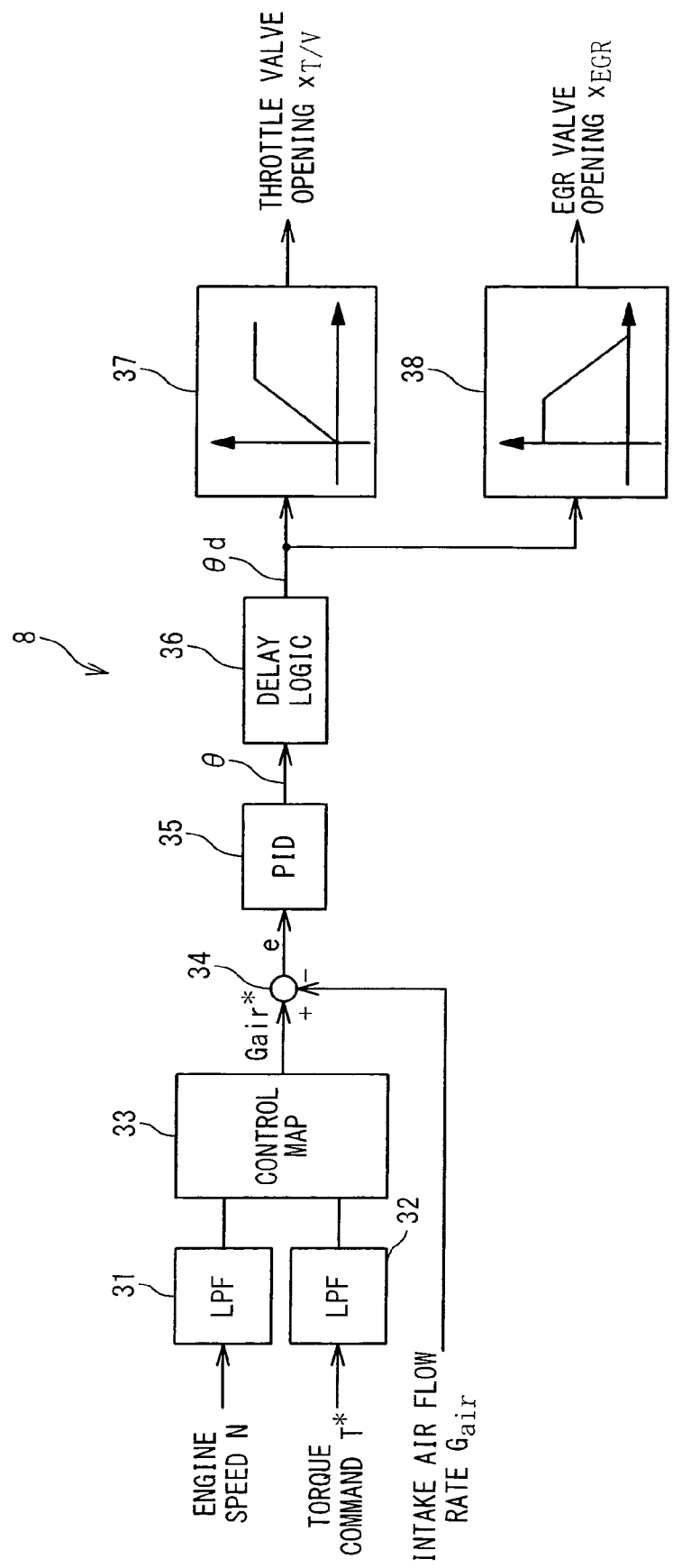
FIG. 3 is a block diagram showing an example of a control logic executed by a controller.

The specific control logic to execute the above control will be described below. FIG. 3 shows the control logic for the openings of the throttle valve 12 and the EGR valve 19. The logic is executed in the controller 8. A torque command T* and the engine speed N measured by the engine speed sensor 21 are given to the controller 8. The torque command T* is a signal designating a torque to be outputted by the diesel engine 2. When the diesel engine system 1 is installed in a vehicle, the torque command T* may be generated, for example, from an accelerator signal generated in response to the motion of an accelerator pedal or an injection quantity command designating an injection quantity of fuel. Also, the accelerator signal or the injection quantity command may be used in place of the torque command T*.

Moreover, the intake air flow rate $G_{air}$ measured by the air flow meter 22 is given to the controller 8. The intake air flow rate $G_{air}$ is obtained by the air flow meter 22. The intake air flow rate $G_{air}$ is used to control the openings of the throttle valve 12 and the EGR valve 19.

Low pass filtering processes 31 and 33 are applied to the engine speed N and the torque command T*, respectively. Moreover, a desired value $G_{air}*$ of the flow rate of the intake air which flows in the intake path 3 is determined from the engine speed N and the torque command T* to which the low pass filtering processes are applied. A control map 33 is used to determine the desired value $G_{air}*$.

Figure 4:
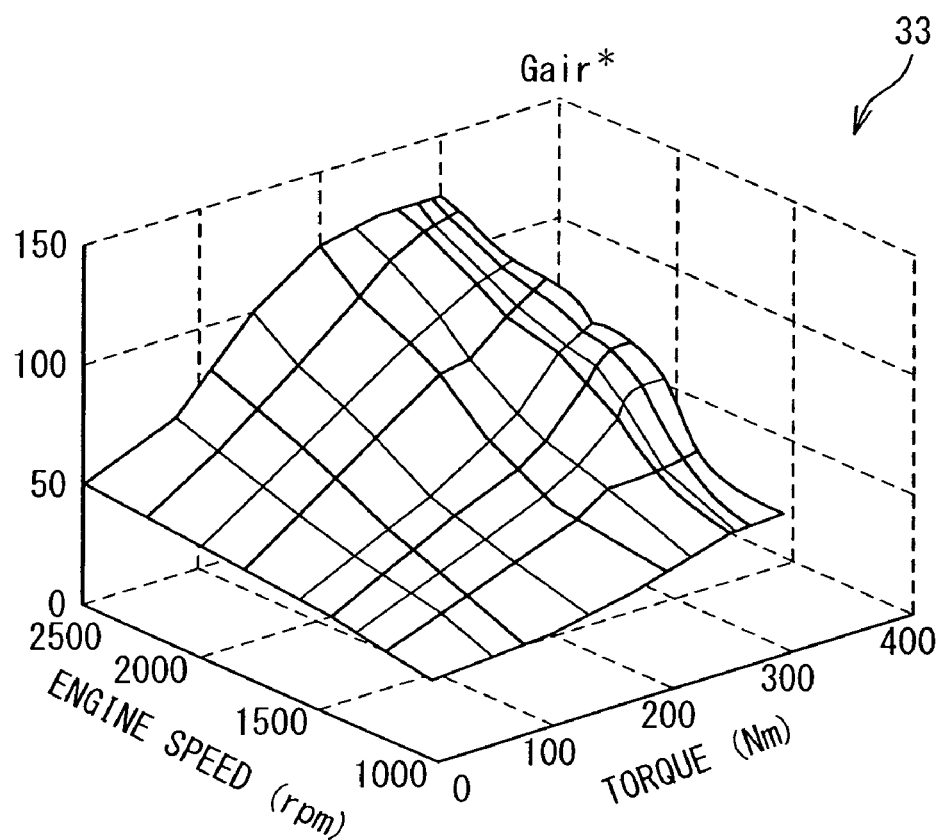
FIG. 4 is a conceptual illustration showing a control map used in the control logic of FIG. 3.

FIG. 4 is a graph showing the control map 33. The control map 33 describes the corresponding relation between the desired value $G_{air}*$ and the combination of the engine speed N and the torque command T*. The control map 33 defines that the desired value $G_{air}*$ increases as the engine speed N increases or as the torque command T* increases.

Moreover, an error e between the determined desired value $G_{air}*$ and the intake air flow rate $G_{air}$ measured by the air flow meter 22 is calculated through a subtracting process 34, and a PID (Proportional-Integral-Derivative) control 35 is executed based on the error e. A control parameter θ is determined through the PID control 35. The control parameter θ is used for determining the opening $x_{T/V}$ of the throttle valve 12 and the opening $x_{EGR}$ of the EGR valve 19. As the load of the engine increases, the desired value $G_{air}*$ increases, and thus, the control parameter θ decreases.

The intake air flow rate $G_{air}$ is the parameter corresponding to the excess air ratio of the diesel engine 2. Thus, the control of the openings of the throttle valve 12 and the EGR valve 19 in response to the intake air flow rate $G_{air}$ is equivalent to the control of the openings of the throttle valve 12 and the EGR valve 19 in response to the excess air ratio of the diesel engine 2. Thus, the excess air ratio of the diesel engine 2 may be used in place of the intake air flow rate $G_{air}$. In this case, the control map 33 describes the corresponding relation between a desired value of the excess air ration and the combination of the engine speed N and the torque command T*. Then, the PID control 35 is executed based on an error e between the excess air ratio of the diesel engine 2 and the desired value of the excess air ratio.

Figure 5:
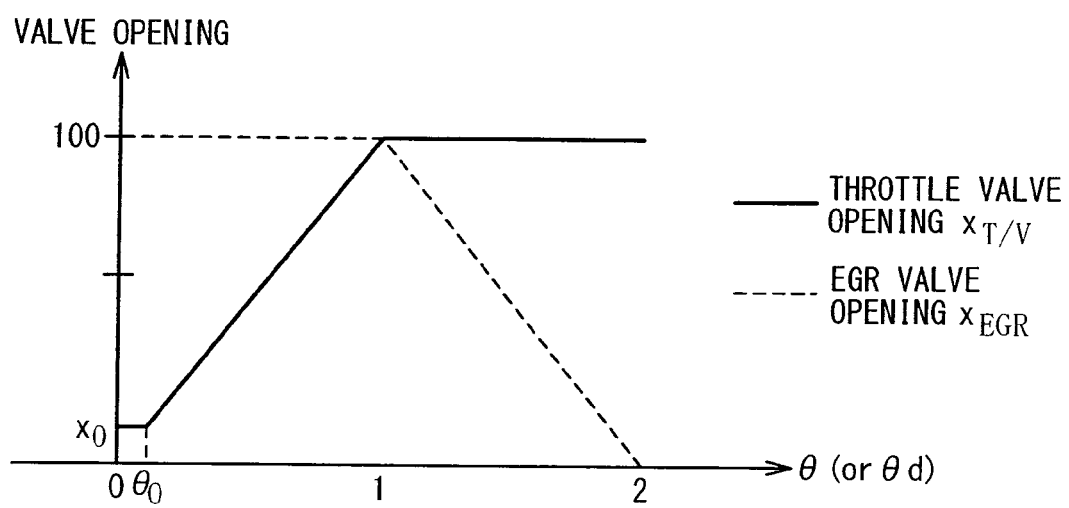
FIG. 5 is a graph showing functions used in the control logic of FIG. 3.

The controller 8 stores a function 37 for determining the opening $x_{T/V}$ (i.e., an opening amount of the opening) of the throttle valve 12 from the control parameter θ and a function 38 for determining the opening $x_{EGR}$ (i.e., an opening amount of the opening) of the EGR valve 19 from the control parameter θ. The controller 8 uses the functions 37 and 38 to determine the opening $x_{T/V}$ of the throttle valve 12 and the opening $x_{EGR}$ of the EGR valve 19. FIG. 5 is a graph showing the relation between the control parameter θ and the opening $x_{T/V}$ of the throttle valve 12 prescribed by the function 37 and the relation between the control parameter θ and the opening $x_{EGR}$ of the EGR valve 19 prescribed by the function 38. In the present embodiment, the opening $x_{T/V}$ of the throttle valve 12 is controlled to a constant value $x_0$ (%) when the control parameter θ is a minute value θ0 or less. When the control parameter θ is from θ0 to 1, the opening $x_{T/V}$ is made to monotonically increase from $x_0$ % to 100% as θ increases. When θ is 1 or more, the opening $x_{T/V}$ is held at 100%. On the other hand, the opening $x_{EGR}$ of the EGR valve 19 is held at 100%, when the control parameter θ is 1 or less. When θ is 1 or more, the opening $x_{EGR}$ is made to monotonically decrease from 100% to 0% as θ increases.

In the present embodiment, the control parameter θ calculated through the PID control 35 is not used directly for the determination of the opening $x_{T/V}$ of the throttle valve 12 and the opening $x_{EGR}$ of the EGR valve 19 through the functions 37 and 38. The controller 8 applies delay logic 36 to the control parameter θ and applies the functions 37 and 38 to the control parameter θ to which the delay logic 36 is applied to determine the opening $x_{T/V}$ of the throttle valve 12 and the opening $x_{EGR}$ of the EGR valve 19. In the following explanation, the control parameter θ after the delay logic 36 is applied is referred to as a control parameter $θ_d$.

The delay logic 36 is used to execute the control in which the openings of the throttle valve 12 and the EGR valve 19 are made to decrease or increase after the elapse of the predetermined holding time. The delay logic 36 is determined as follows. When the control parameter θ is made to decrease, the control parameter $θ_d$ is made to decrease to follow the decrease in the control parameter θ after the control parameter $θ_d$ is held constant for the predetermined holding time. The decreasing rate of the control parameter $θ_d$ is limited to a predetermined range. Since the control parameter $θ_d$ is held constant for the predetermined holding time when the control parameter θ decreases, the opening $x_{T/V}$ is held constant for the predetermined holding time when the opening $x_{T/V}$ of the throttle valve 12 is made to decrease, in addition, the opening $x_{EGR}$ is held constant for the predetermined holding time when the opening $x_{EGR}$ of the EGR valve 19 is made to increase. On the other hand, when the control parameter θ is made to increase, the control parameter $θ_d$ is determined to be equal to the control parameter θ. Consequently, the opening $x_{T/V}$ is made to increase immediately (without waiting for the elapse of the holding time) when opening $x_{T/V}$ of the throttle valve 12 is made to increase, and, the opening $x_{EGR}$ is made to decrease immediately (without waiting for the elapse of the holding time) when the opening $x_{EGR}$ of the EGR valve 19 is made to decrease. According to such control, the production of the smoke is effectively suppressed during the increase in the load of the engine without inhibiting the reduction of the nitrogen oxide as described above.

In the above explanations, the control is executed in which the openings of both of the throttle valve 12 and the EGR valve 19 are made to decrease or increase after the elapse of the predetermined holding time. A control can be executed in which only one of the openings of the throttle valve 12 and the EGR valve 19 is made to decrease or increase after the elapse of the predetermined holding time.

That is, in another embodiment, the decrease in the opening $x_{T/V}$ is started after the opening $x_{T/V}$ is held constant for the predetermined holding time when the opening $x_{T/V}$ of the throttle valve 12 is made to decrease, the opening $x_{T/V}$ is made to increase immediately (without waiting for the elapse of the holding time) when the opening $x_{T/V}$ is made to increase. On the other hand, as for the EGR valve 19, the opening $x_{EGR}$ is made to decrease and increase without waiting for the elapse of the holding time. Such operation can be implemented, for example, by applying the function 37 to the control parameter $θ_d$ to which the delay logic 36 is applied to calculate the opening $x_{T/V}$ of the throttle valve 12 and by applying the function 38 to the control parameter θ (to which the delay logic 36 is not applied) to calculate the opening $x_{EGR}$ of the EGR valve 19. Also in such control, the necessary flow rate of the intake air is secured during the increase in the load while suppressing the production of the smoke.

In still another embodiment, the increase in the opening $x_{EGR}$ is started after the opening $x_{EGR}$ is held constant for the predetermined holding time when the opening $x_{EGR}$ of the EGR valve 19 is made to increase, the opening $x_{EGR}$ is made to decrease immediately (without waiting for the elapse of the holding time) when the opening $x_{EGR}$ is made to decrease. On the other hand, as for the throttle valve 12, the opening $x_{T/V}$ is made to decrease and increase without waiting for the elapse of the holding time. Such operation can be implemented, for example, by applying the function 37 to the control parameter θ (to which the delay logic 36 is not applied) to calculate the opening $x_{T/V}$ of the throttle valve 12 and by applying the function 38 to the control parameter $θ_d$ to which the delay logic 36 is applied to calculate the opening $x_{EGR}$ of the EGR valve 19.

The holding time for the opening $x_{T/V}$ of the throttle valve 12 and the holding time for the opening $x_{EGR}$ of the EGR valve 19 may be different. Such control can be implemented when the holding time in the delay logic 36 applied with respect to the opening $x_{T/V}$ of the throttle valve 12 is different from that in the delay logic 36 applied with respect to the opening $x_{EGR}$ of the EGR valve 19.

Figure 6A:
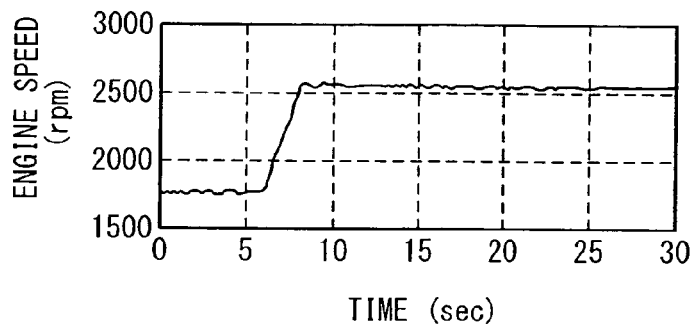
FIG. 6A is a graph showing a change in engine speed when a control is executed in which the opening of the throttle valve and/or the opening of the EGR valve is held constant during a predetermined holding time.
Figure 6B:
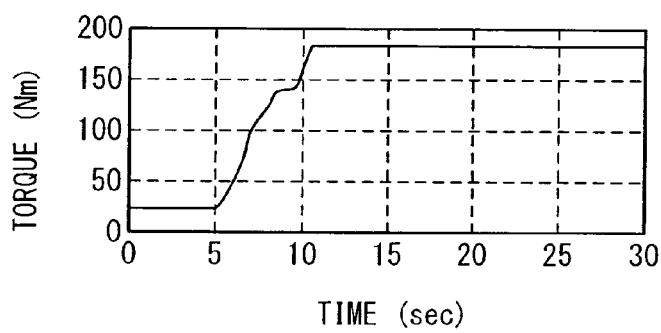
FIG. 6B is a graph showing a change in torque when the control is executed.
Figure 6C:
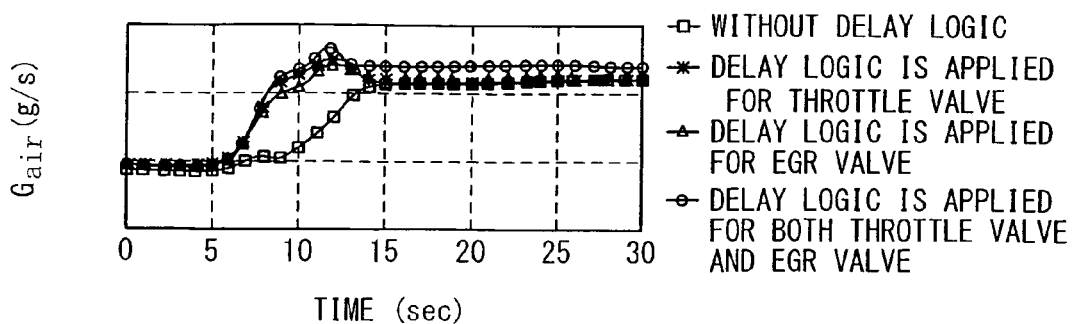
FIG. 6C is a graph showing a change in flow rate of intake air when the control is executed.
Figure 6D:
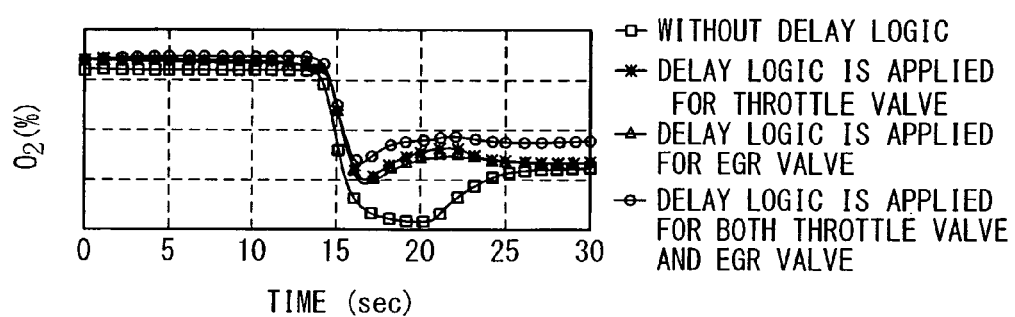
FIG. 6D is a graph showing a change in oxygen concentration in exhaust gas when the control is executed.
Figure 6E:
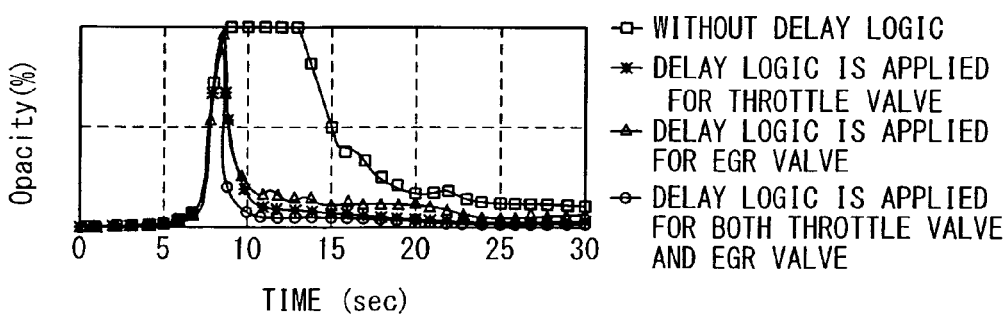
FIG. 6E is a graph showing a change in opacity of the exhaust gas when the control is executed.

FIGS. 6A to 6E are graphs showing the effectiveness of applying the delay logic 36 for the determination of the opening $x_{T/V}$ of the throttle valve 12 and the opening $x_{EGR}$ of the EGR valve 19. FIGS. 6A to 6E show responses of the diesel engine system 1 according to the present embodiment when the load of the diesel engine 2 increases. The holding times for the opening $x_{T/V}$ of the throttle valve 12 and the opening $x_{EGR}$ of the EGR valve 19 are set to 4 seconds. In detail, FIG. 6A shows change in the engine speed of the diesel engine 2, FIG. 6B shows change in the output torque of the diesel engine 2, FIG. 6C shows change in the intake air flow rate, FIG. 6D shows change in the oxygen concentration in the exhaust gas, and FIG. 6E shows change in opacity of the exhaust gas. The oxygen concentration in the exhaust gas shown in FIG. 6D corresponds to the oxygen quantity used for the combustion in the diesel engine 2, and a low oxygen concentration in the exhaust gas implies that the imperfect combustion occurs. On the other hand, the opacity shown in FIG. 6E corresponds to the production of the smoke, and a high opacity implies that the smoke is being produced.

When the load of the diesel engine 2 increases, the intake air flow rate $G_{air}$ also increases. As for a comparison example in which the delay logic 36 is not used, when the load of the diesel engine 2 increases, the opening of the EGR valve 19 is made to increase to suppress the production of the nitrogen oxide and the opening of the throttle valve 12 is made to decrease. Consequently, the increase in the intake air flow rate $G_{air}$ is delayed. The delay of the increase in the intake air flow rate $G_{air}$ causes the imperfect combustion in the diesel engine 2 as shown in FIG. 6D and the production of the smoke for a long time as shown in FIG. 6E. The production of the smoke for the long time appears as phenomena that the opacity of the exhaust gas continues to be high for the long time.

On the other hand, as can be understood from FIG. 6C, when the delay logic 36 according to the present invention is used, the intake air flow rate $G_{air}$ is made to increase rapidly. The intake air flow rate $G_{air}$ is made to increase rapidly in all of the cases that the delay logic 36 is applied only to the determination of the opening $x_{T/V}$ of the throttle valve 12, and that the delay logic 36 is applied only to the determination of the opening $x_{EGR}$ of the EGR valve 19 and that the delay logic 36 is applied to both of them. Since the intake air flow rate $G_{air}$ is made to increase rapidly, as shown in FIG. 6D, the imperfect combustion in the diesel engine 2 is prevented and the production of the smoke is suppressed. The suppression of the production of the smoke appears as phenomena that the duration in which the opacity of the exhaust gas is high is short.

From FIG. 6C, it is understood that the application of the delay logic 36 to both of the determinations of the opening $x_{T/V}$ of the throttle valve 12 and the opening $x_{EGR}$ of the EGR valve 19 results in the most rapid increase in the intake air flow rate $G_{air}$. This indicates the effectiveness of the application of the delay logic 36 for both of the opening $x_{T/V}$ of the throttle valve 12 and the opening $x_{EGR}$ of the EGR valve 19. However, as can be understood from FIGS. 6A to 6E, it is also effective to apply the delay logic 36 to only one of them.

Figure 7:
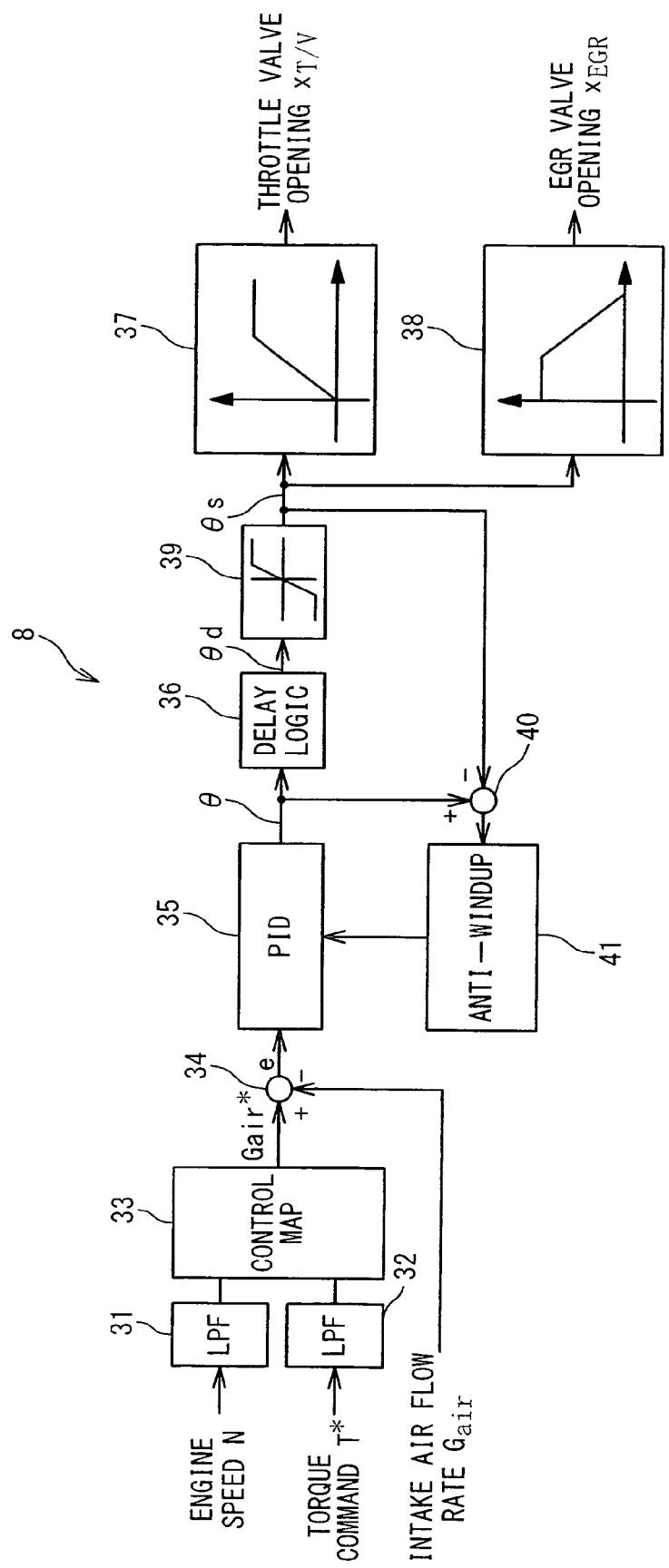
FIG. 7 is a block diagram showing another example of the control logic executed by the controller.

FIG. 7 shows another example of the control logic executed by the controller 8. In the control logic of FIG. 7, corresponding to saturations (namely, a fully opened position and a fully closed position) in the throttle valve 12 and the EGR valve 19, a saturation calculation 39 is added to the control logic. In the present embodiment, the saturation calculation 39 is applied to the control parameter $θ_d$ to which the delay logic 36 is applied to calculate a control parameter $θ_g$. Specifically, the control parameter $θ_s$ is set to equal to the control parameter $θ_d$ when the control parameter $θ_d$ is from 0 to 2, the control parameter $θ_s$ set to 0 when the control parameter $θ_d$ is 0 or less, the control parameter $θ_s$ is set to 2 when the control parameter $θ_d$ is 2 or more. Then, the functions 37 and 38 are applied to the control parameter $θ_s$ to calculate the opening $x_{T/V}$ of the throttle valve 12 and the opening $x_{EGR}$ of the EGR valve 19.

There is a problem that the saturations in the throttle valve 12 and the EGR valve 19 causes a windup. When the throttle valve 12 or the EGR valve 19 is fully opened or fully closed, a control error continues to exist. On the other hand, since the error e used in the PID control 35 is held to other than 0, an integral value in the PID control 35 continues to increase to the extent that the response of the control becomes worse. When the delay logic 36 is used, the problem of windup is conspicuous.

In order to effectively avoid the problem of windup, in the present embodiment, the delay logic 36 is applied to the control parameter θ to obtain the control parameter $θ_d$, the saturation calculation 39 is applied to the control parameter $θ_d$ to obtain the control parameter $θ_s$, and an anti-windup compensation 41 is executed based on the control parameter $θ_s$.

Figure 8:
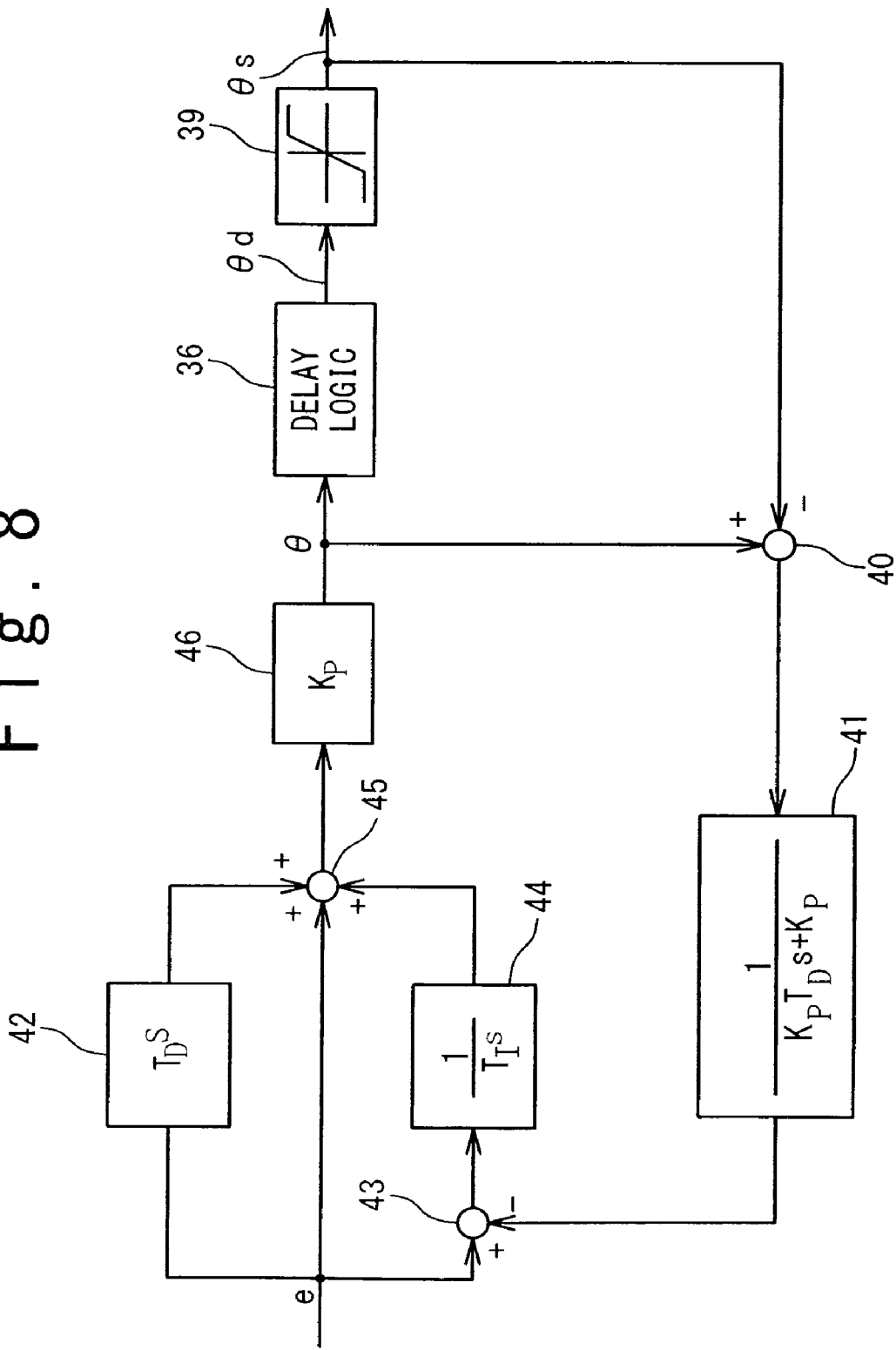
FIG. 8 is a block diagram showing an example of an anti-windup compensation executed in the control logic of FIG. 7.

FIG. 8 is a control block diagram showing the PID control 35 and the anti-windup compensation 41. In the PID control 35, the error e, a result of differentiation 42 and a result of integration 44 are added to obtain a sum, and a multiplication 46 is executed in which the sum is multiplied by a proportional gain $K_p$. Here, the integration 44 is applied to the error e from which a result of the anti-windup compensation 41 is subtracted. In a subtraction 40, the difference is calculated between the control parameter θ which is obtained through the PID control 35 (in the preceding control step one step before the present control step) and the control parameter $θ_s$ which is obtained through the saturation calculation 39 (in the preceding control step). The anti-windup compensation 41 is executed based on the difference. The following equation can be used as a transfer function $F_{AWV}(s)$ of the anti-windup compensation 41.

$$F_{AWU}(s) = \frac{1}{K_P T_D s + K_P} \Lambda \quad (1)$$

Here, $K_P$ is the proportional gain of the PID control 35, and $T_D$ is the derivative time of the PID control 35. The anti-windup compensation 41 prevents the windup to make the response of the control worse.

The anti-windup compensation 41 is effective, not only in the case that the PID control 35 is executed as described in the present embodiment, but also in the case that a PI (Proportional-Integral) control is executed in place of the PID control 35.

Figure 9:
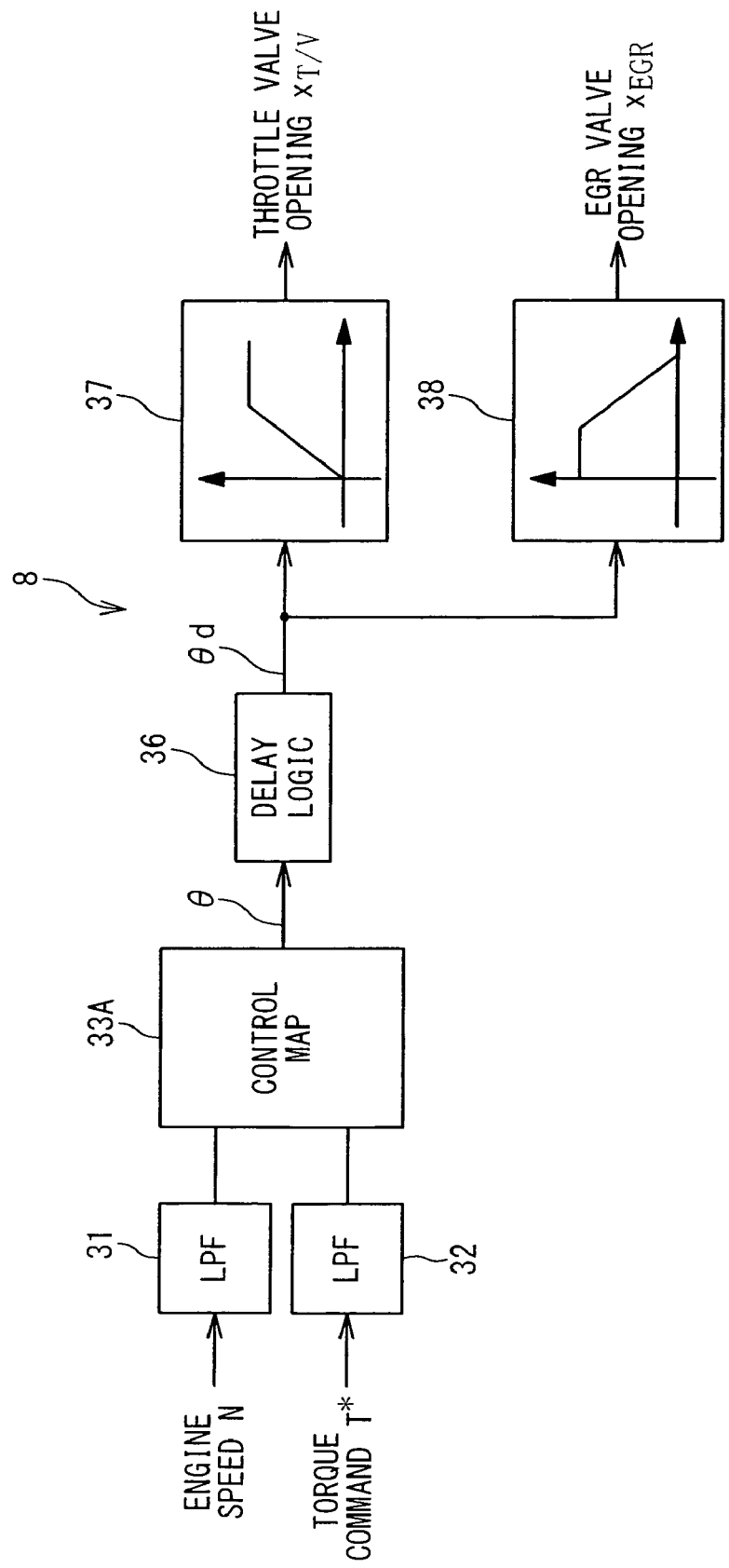
FIG. 9 is a block diagram showing another example of the control logic executed by the controller.

As shown in FIG. 3 and FIG. 8, the control parameter θ is determined through the feedback control based on the intake air flow rate $G_{air}$. As shown in FIG. 9, it is also possible to determine the control parameter θ through a feedforward control based on the load of the diesel engine 2. Namely, it is also possible to determine the opening $x_{T/V}$ of the throttle valve 12 and the opening $x_{EGR}$ of the EGR valve 19 through the feedforward control. In the feedforward control, since the opening $x_{T/V}$ of the throttle valve 12 and the opening $x_{EGR}$ of the EGR valve 19 are controlled in a short time after the start of change of the load of the diesel engine 2, the production of the smoke is more conspicuous than that in the feedback control. Hence, when the feedforward control is executed, the control is especially effective in which the opening of $x_{T/V}$ of the throttle valve 12 and the opening $x_{EGR}$ of the EGR valve 19 are made to increase or decrease after the predetermined holding time.

Specifically, the engine speed N and the torque command T* are given to the controller 8, and low pass filtering processes 31 and 33 are executed on the engine speed N and the torque command T*. The control parameter θ is determined by using a control map 33A from the engine speed N and the torque command T* on which the low pass filtering processes are executed. The control map 33A describes the corresponding relation between the control parameter θ and the combination of the engine speed N and the torque command T*. The control map 33A defines that the control parameter θ decreases as the engine speed N increases or as the torque command T* increases.

The delay logic 36 is applied to the control parameter θ obtained by using the control map 33A to calculate the control parameter $θ_d$. Then, the functions 37 and 38 are applied to the control parameter $θ_d$ (to which the delay logic 36 is applied) to determine the opening $x_{T/V}$ of the throttle valve 12 and the opening $x_{EGR}$ of the EGR valve 19. The function 37 is used for determining the opening $x_{T/V}$ of the throttle valve 12 from the control parameter $θ_d$, and the function 38 is used for determining the opening $x_{EGR}$ of the EGR valve 19 from the control parameter $θ_d$.

Also in the control shown in FIG. 9, the application of the delay logic 36 can effectively suppress the production of the smoke during the increase in the load of the engine without inhibiting the reduction of the nitrogen oxide. In detail, when the control parameter θ is made to decrease, the control parameter $θ_d$ is made to decrease to follow the decrease in the control parameter θ after the control parameter $θ_d$ is held constant for the predetermined holding time. Since the control parameter $θ_d$ is held constant for the predetermined holding time when the control parameter θ decreases, the opening $x_{T/V}$ is held constant for the predetermined holding time when the opening $x_{T/V}$ of the throttle valve 12 is made to decrease, in addition, the opening $x_{EGR}$ is held constant for the predetermined holding time when the opening $x_{EGR}$ of the EGR valve 19 is made to increase. On the other hand, when the control parameter θ is made to increase, the control parameter $θ_d$ is determined to be equal to the control parameter θ. Consequently, the opening $x_{T/V}$ is made to increase immediately (without waiting for the elapse of the holding time) when opening $x_{T/V}$ of the throttle valve 12 is made to increase, and, the opening $x_{EGR}$ is made to decrease immediately (without waiting for the elapse of the holding time) when the opening $x_{EGR}$ of the EGR valve 19 is made to decrease. According to such control, the production of the smoke is effectively suppressed during the increase in the load of the engine without inhibiting the reduction of the nitrogen oxide as described above.

When the feedforward control of FIG. 9 is executed, the holding time is preferred to be longer than that in the case that the feedback control of FIG. 3 is executed. In the feedback control, the intake air flow rate (or the excess air ratio) is detected, and the throttle valve 12 and the EGR valve 19 are controlled based on the intake air flow rate (or the excess air ratio). Thus, it is relatively easy to secure the necessary intake air flow rate for a current driving state of the engine. In other words, a relatively short holding time is enough to secure the necessary intake air flow rate. On the other hand, in the feedforward control, the intake air flow rate (or the excess air ratio) is not considered for controlling the throttle valve 12 and the EGR valve 19. Thus, a severe shortage of the intake air flow rate is apt to occur during the increase in the load of the engine. For this reason, in order to sufficiently suppress the production of the smoke, when the feedforward control of FIG. 9 is executed, the holding time is preferably set to be longer than that in the case that the feedback control of FIG. 3 is executed.

Specifically, when the feedforward control of FIG. 9 is executed, the holding times for the opening $x_{T/V}$ of the throttle valve 12 and the opening $x_{EGR}$ of the EGR valve 19 are preferably from 1 second to 10 seconds, and more preferably from 3 second to 10 seconds. When the holding times of the opening $x_{T/V}$ of the throttle valve 12 and the opening $x_{EGR}$ of the EGR valve 19 are too short, the necessary flow rate of the intake air is not secured during the increase in the load of the diesel engine 2. On the other hand, when the holding times of the opening $x_{T/V}$ of the throttle valve 12 and the opening $x_{EGR}$ of the EGR valve 19 are too long, resulting in undesired increase in the production of the nitrogen oxide.

What is claimed is:

1. A diesel engine system comprising:
a diesel engine;
a throttle valve configured to control a flow rate of intake air to said diesel engine;
an EGR (Exhaust Gas Recirculation) path along which exhaust gas is recirculated from an exhaust port to an intake port of said diesel engine;
an EGR valve configured to control a flow rate of the exhaust gas; and
a controller configured to execute a valve control in which said throttle valve and said EGR valve are controlled such that an opening of said throttle valve is decreased and an opening of said EGR valve is increased when a load of said diesel engine increases,
wherein said EGR valve is controlled in the valve control such that the opening of said EGR valve is increased after the opening of said EGR valve is held constant for a first predetermined holding time.

2. The diesel engine system according to claim 1, wherein said throttle valve is controlled in the valve control such that the opening of said throttle valve is decreased after the opening of said throttle valve is held constant for a second predetermined holding time.

3. The diesel engine system according to claim 2, wherein the first predetermined holding time is from 1 second to 5 seconds.

4. The diesel engine system according to claim 3, wherein the second predetermined holding time is from 1 second to 5 seconds.

5. The diesel engine system according to claim 1, further comprising:

an air flow meter configured to measure the flow rate of the intake air, wherein said controller is configured to determine a desired value of the flow rate of the intake air from the load and determine an opening amount of the opening of said throttle valve and an opening amount of the opening of said EGR valve through a feedback control based on an error between the desired value and a measured value of the flow rate of the intake air obtained by said air flow meter.

6. The diesel engine system according to claim 5, wherein said controller is configured to determine a first control parameter through a PID (Proportional-Integral-Derivative) or PI (Proportional-Integral) control based on the error, determine a second control parameter by applying a delay logic to the first control parameter, determine a third control parameter by applying a saturation calculation to the second control parameter and determine the opening amount of the opening of said throttle valve and the opening amount of the opening of said EGR valve from the third control parameter, the delay logic is defined such that the second control parameter is held for the first holding time when the opening of said EGR valve is made to increase, said controller is configured to execute an anti-windup correlation on the PID or PI control, and the anti-windup correlation is executed based on a difference between the first control parameter and the third control parameter.

7. The diesel engine system according to claim 1, wherein said controller is configured to determine an opening amount of the opening of said throttle valve and an opening amount of the opening of said EGR valve through a feedforward control based on the load.

8. The diesel engine system according to claim 7, wherein the first holding time is from 1 second to 10 seconds.

9. A diesel engine system comprising:
a diesel engine;
a throttle valve configured to control a flow rate of intake air to said diesel engine;
an EGR (Exhaust Gas Recirculation) path along which exhaust gas is recirculated from an exhaust port to an intake port of said diesel engine;
an EGR valve configured to control a flow rate of the exhaust gas; and
a controller configured to execute a valve control in which said throttle valve and said EGR valve are controlled such that an opening of said throttle valve is decreased and an opening of said EGR valve is increased when a load of said diesel engine increases, wherein said throttle valve is controlled in the valve control such that the opening of said throttle valve is decreased after the opening of said throttle valve is held constant for a predetermined holding time.

10. A control method of a diesel engine system including a diesel engine, a throttle valve configured to control a flow rate of intake air to the diesel engine, an EGR (Exhaust Gas Recirculation) path along which exhaust gas is recirculated from an exhaust port to an intake port of the diesel engine and an EGR valve configured to control a flow rate of the exhaust gas, the control method comprising:

controlling the throttle valve and the EGR valve such that an opening of the throttle valve is decreased and an opening of the EGR valve is increased when a load of the diesel engine increases, wherein said controlling of the EGR valve is executed such that the opening of the EGR valve is increased after the opening of the EGR valve is held constant for a predetermined holding time.

11. A control method of a diesel engine system including a diesel engine, a throttle valve configured to control a flow rate of intake air to the diesel engine, an EGR (Exhaust Gas Recirculation) path along which exhaust gas is recirculated from an exhaust port to an intake port of the diesel engine and an EGR valve configured to control a flow rate of the exhaust gas, the control method comprising:

controlling the throttle valve and the EGR valve such that an opening of the throttle valve is decreased and an opening of the EGR valve is increased when a load of the diesel engine increases, wherein said controlling of the throttle valve is executed such that the opening of the throttle valve is decreased after the opening of the throttle valve is held constant for a predetermined holding time.

* * * * *